United States Patent
Tobias et al.

(10) Patent No.: US 9,529,080 B2
(45) Date of Patent: Dec. 27, 2016

(54) SYSTEM AND APPARATUS HAVING AN APPLICATION PROGRAMMING INTERFACE FOR FLEXIBLE CONTROL OF EXECUTION ULTRASOUND ACTIONS

(71) Applicant: White Eagle Sonic Technologies, Inc., Santa Clara, CA (US)

(72) Inventors: Richard Tobias, San Jose, CA (US); Bicheng Wu, Palo Alto, CA (US); Ashish Parikh, Los Altos, CA (US)

(73) Assignee: White Eagle Sonic Technologies, Inc., Santa Clara, CA (US)

( * ) Notice: Subject to any disclaimer, the term of this patent is extended or adjusted under 35 U.S.C. 154(b) by 167 days.

(21) Appl. No.: 14/098,469

(22) Filed: Dec. 5, 2013

(65) Prior Publication Data
US 2014/0165069 A1    Jun. 12, 2014

Related U.S. Application Data

(60) Provisional application No. 61/734,067, filed on Dec. 6, 2012, provisional application No. 61/734,291, filed
(Continued)

(51) Int. Cl.
*G01S 7/52* (2006.01)
*B06B 1/02* (2006.01)
*G06F 9/46* (2006.01)

(52) U.S. Cl.
CPC ......... *G01S 7/52098* (2013.01); *B06B 1/0207* (2013.01); *G01S 7/52085* (2013.01)

(58) Field of Classification Search
None
See application file for complete search history.

(56) References Cited

U.S. PATENT DOCUMENTS

| 4,287,768 A | 9/1981 | Hayakawa et al. |
| 4,572,202 A | 2/1986 | Thomenius |

(Continued)

FOREIGN PATENT DOCUMENTS

| CN | 1179298 A | 4/1998 |
| CN | 1646064 A | 7/2005 |
| WO | WO2012123942 A1 | 9/2012 |

OTHER PUBLICATIONS

U.S. Appl. No. 14/098,464 Office Action dated Jul. 16, 2015.
(Continued)

*Primary Examiner* — Eric C Wai
(74) *Attorney, Agent, or Firm* — Blakely Sokoloff Taylor & Zafman LLP

(57) ABSTRACT

Apparatus to control and execute ultrasound system actions includes API that includes API procedure, processor coupled to API, adaptive scheduler, and memory. Adaptive scheduler includes beamer to generate signals, probe interface to transmit the signals to at least one probe unit and to receive signals from the at least one probe unit, and receiver to receive and process the signals received from the probe interface. Memory stores instructions, which when executed, causes processor to receive task list including task actions. Processor may execute API procedure to generate scan specification that is a data structure that includes task list. Processor may execute API procedure to identify at least one of: a probe required to perform the task actions, a beam required to perform the task actions and requirements and parameters associated with the beam, or a format of a beam firing result. Other embodiments are described.

24 Claims, 3 Drawing Sheets

Related U.S. Application Data on Dec. 6, 2012, provisional application No. 61/746,096, filed on Dec. 26, 2012.

(56) References Cited

U.S. PATENT DOCUMENTS

| | | | |
|---|---|---|---|
| 5,119,342 | A | 6/1992 | Harrison, Jr. et al. |
| 5,121,361 | A | 6/1992 | Harrison, Jr. et al. |
| 5,140,192 | A | 8/1992 | Nogle |
| 5,641,908 | A | 6/1997 | Hayakawa |
| 5,680,865 | A | 10/1997 | Tanaka |
| 5,709,209 | A | 1/1998 | Friemel et al. |
| 5,797,846 | A | 8/1998 | Seyed-Bolorforosh |
| 5,919,138 | A | 7/1999 | Ustuner |
| 5,921,932 | A | 7/1999 | Wright et al. |
| 5,928,152 | A | 7/1999 | Wright et al. |
| 6,029,116 | A | 2/2000 | Wright et al. |
| 6,124,828 | A | 9/2000 | Champeau |
| 6,126,601 | A | 10/2000 | Gilling et al. |
| 6,126,607 | A | 10/2000 | Whitmore et al. |
| 6,402,693 | B1 | 6/2002 | Emery |
| 6,436,049 | B1 | 8/2002 | Kamiyama et al. |
| 6,438,401 | B1 | 8/2002 | Cheng et al. |
| 6,459,925 | B1 | 10/2002 | Nields et al. |
| 6,468,212 | B1 | 10/2002 | Scott et al. |
| 6,526,163 | B1 * | 2/2003 | Halmann ............ G01S 7/52044 382/128 |
| 6,567,687 | B2 | 5/2003 | Front et al. |
| 6,585,651 | B2 | 7/2003 | Nolte et al. |
| 6,714,667 | B1 | 3/2004 | Mooney et al. |
| 6,839,762 | B1 * | 1/2005 | Yu ........................ A61B 5/0456 709/230 |
| 6,980,419 | B2 | 12/2005 | Smith et al. |
| 7,022,075 | B2 | 4/2006 | Grunwald et al. |
| 7,043,063 | B1 | 5/2006 | Noble et al. |
| 7,069,425 | B1 | 6/2006 | Takahashi |
| 7,115,093 | B2 | 10/2006 | Halmann et al. |
| 7,117,134 | B2 | 10/2006 | Dubois et al. |
| 7,280,473 | B2 | 10/2007 | Wu et al. |
| 7,347,820 | B2 | 3/2008 | Bonnefous |
| 7,450,130 | B2 | 11/2008 | Swedberg et al. |
| 7,514,069 | B2 | 4/2009 | Achilefu et al. |
| 7,536,535 | B2 | 5/2009 | Wood |
| 7,648,461 | B2 | 1/2010 | Thiele |
| 7,850,912 | B2 | 12/2010 | Favuzzi et al. |
| 7,991,986 | B2 | 8/2011 | Yamamoto et al. |
| 8,081,806 | B2 | 12/2011 | Friedman et al. |
| 8,096,949 | B2 | 1/2012 | Chen et al. |
| 8,167,803 | B2 | 5/2012 | McMorrow et al. |
| 8,226,560 | B2 | 7/2012 | Arai et al. |
| 8,248,885 | B2 | 8/2012 | Ma et al. |
| 8,287,471 | B2 | 10/2012 | Liu et al. |
| 8,289,284 | B2 | 10/2012 | Glynn et al. |
| 2002/0198454 | A1 | 12/2002 | Seward et al. |
| 2003/0135712 | A1 | 7/2003 | Theis |
| 2004/0006272 | A1 | 1/2004 | Vortman et al. |
| 2004/0019447 | A1 | 1/2004 | Shachar |
| 2004/0250050 | A1 | 12/2004 | Ludden et al. |
| 2004/0254465 | A1 | 12/2004 | Sano et al. |
| 2005/0074154 | A1 | 4/2005 | Georgescu et al. |
| 2005/0075566 | A1 | 4/2005 | Satoh |
| 2006/0004606 | A1 | 1/2006 | Wendl et al. |
| 2006/0058673 | A1 | 3/2006 | Aase et al. |
| 2006/0116578 | A1 | 6/2006 | Grunwald et al. |
| 2006/0288194 | A1 | 12/2006 | Lewis et al. |
| 2007/0255139 | A1 | 11/2007 | Deschinger et al. |
| 2007/0258631 | A1 | 11/2007 | Friedman et al. |
| 2007/0258632 | A1 | 11/2007 | Friedman et al. |
| 2007/0259158 | A1 | 11/2007 | Friedman et al. |
| 2007/0260861 | A1 | 11/2007 | Kaabouch et al. |
| 2008/0033292 | A1 | 2/2008 | Shafran |
| 2008/0077820 | A1 | 3/2008 | Jensen et al. |
| 2008/0126639 | A1 | 5/2008 | Oakes et al. |
| 2008/0146922 | A1 | 6/2008 | Steins et al. |
| 2008/0242993 | A1 | 10/2008 | Shin |
| 2008/0249407 | A1 | 10/2008 | Hill et al. |
| 2008/0249410 | A1 | 10/2008 | Okuno |
| 2008/0300487 | A1 | 12/2008 | Govari et al. |
| 2009/0012394 | A1 | 1/2009 | Hobelsberger et al. |
| 2009/0043195 | A1 | 2/2009 | Poland |
| 2009/0089555 | A1 | 4/2009 | Cataldo et al. |
| 2009/0138318 | A1 | 5/2009 | Hawkins et al. |
| 2009/0187099 | A1 | 7/2009 | Burcher |
| 2010/0016719 | A1 | 1/2010 | Freiburger et al. |
| 2010/0017750 | A1 | 1/2010 | Rosenberg et al. |
| 2010/0023886 | A1 | 1/2010 | Shin et al. |
| 2010/0312113 | A1 | 12/2010 | Ogasawara et al. |
| 2010/0324420 | A1 | 12/2010 | Snook et al. |
| 2011/0201900 | A1 | 8/2011 | Zhang et al. |
| 2011/0288413 | A1 | 11/2011 | Baba et al. |
| 2012/0092527 | A1 | 4/2012 | Lavin et al. |
| 2012/0157842 | A1 | 6/2012 | Davis et al. |
| 2012/0157843 | A1 | 6/2012 | Lavin et al. |
| 2013/0251221 | A1 | 9/2013 | Harrison |
| 2013/0263511 | A1 | 10/2013 | Agam et al. |

OTHER PUBLICATIONS

PCT: Notification of Transmittal of the International Search Report and the Written Opinion of the International Searching Authority, or the Declaration mailed Feb. 24, 2014 for International Application No. PCT/US2013/073554, International Filing Date Dec. 6, 2013.
U.S. Appl. No. 14/098,444 Office Action dated Mar. 25, 2016.
U.S. Appl. No. 14/098,459 Office Action dated Mar. 8, 2016.
U.S. Appl. No. 14/098,452 Office Action dated Feb. 5, 2016.
U.S. Appl. No. 14/098,464 Office Action dated Feb. 5, 2016.
U.S. Appl. No. 14/098,472 Office Action dated Nov. 30, 2015.
U.S. Appl. No. 14/098,472 Final Office Action dated May 23, 2016.
CN Patent Application 201380071646.2 Office Action dated Sep. 28, 2016.
U.S. Appl. No. 14/098,472 Office Action dated Aug. 26, 2016.

* cited by examiner

SYSTEM AND APPARATUS HAVING AN APPLICATION PROGRAMMING INTERFACE FOR FLEXIBLE CONTROL OF EXECUTION ULTRASOUND ACTIONS

CROSS-REFERENCED AND RELATED APPLICATIONS

This application claims the benefit pursuant to 35 U.S.C. 119(e) of U.S. Provisional Application No. 61/746,096,filed on Dec. 26, 2012, which application is specifically incorporated herein, in its entirety, by reference.

This application claims the benefit pursuant to 35 U.S.C. 119(e) of U.S. Provisional Application No. 61/734,067, filed on Dec. 6, 2012, which application is specifically incorporated herein, in its entirety, by reference.

This application claims the benefit pursuant to 35 U.S.C. 119(e) of Provisional U.S. application Ser. No. 61/734,291, filed on Dec. 6, 2012, which application is specifically incorporated herein, in its entirety, by reference.

TECHNICAL FIELD

Embodiments of the invention generally relate to an ultrasound apparatus providing an application programming interface for controlling the execution of multiple simultaneous functions and dynamically changing beam firings.

BACKGROUND

Today's ultrasound systems have limited, fixed functionality and require sophisticated user control. Most ultrasound systems cannot provide multiple simultaneous functions. The ultrasound systems that can provide multiple simultaneous functions have the functions as fixed functions that are not flexible to user demands or need for adaptation. Accordingly, in these systems, a selection between different functions may be available, however, no deviations that relate, for example, to timing of the fixed functions is possible. For example, in the case of ultrasound systems, it may be possible to have a Doppler beam and a B-mode beam. The combined functions of the different beams are provided as preprogrammed solutions. These solutions are selected, for example, by using a touch of a button. However, there is no flexibility provided to the user of the system for changes that require the reconfiguring and reshuffling of the timed scheduled actions that are included in the preprogrammed solutions.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

Figure 1:
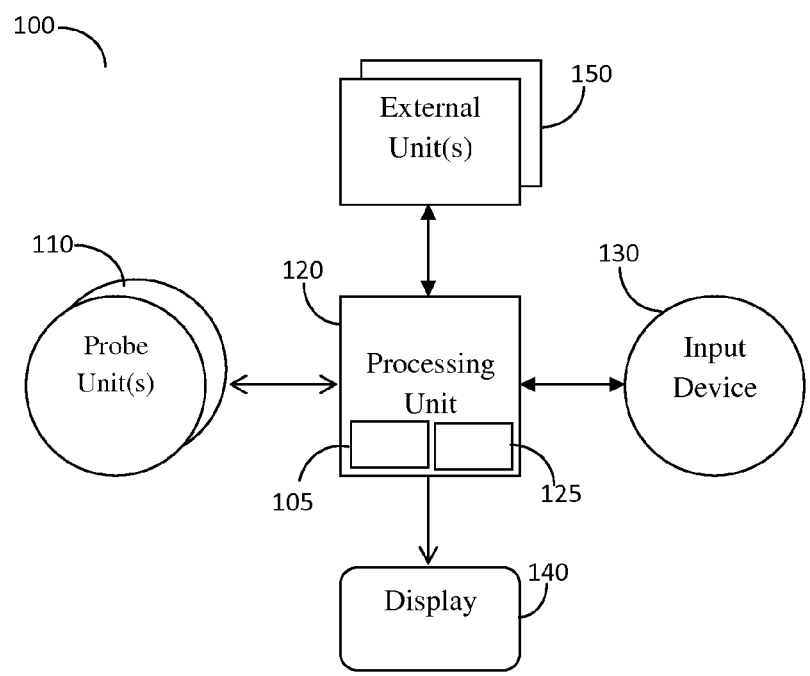
FIG. 1 shows an ultrasound system including an adaptive scheduler for executing ultrasound system actions in real time according to an embodiment of the invention.

In the following description, numerous specific details are set forth. However, it is understood that embodiments of the invention may be practiced without these specific details. In other instances, well-known circuits, structures, and techniques have not been shown to avoid obscuring the understanding of this description.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

A sophisticated ultrasound system supports multiple simultaneous functions such as imaging, blood flow measurement and heartbeat monitoring. The ultrasound system performs these functions by executing sequences of actions such as firing beams, receiving beam data, and moving mechanical arms. These actions frequently have rigorous real-time requirements. The ultrasound system performs functions by executing one or more parallel tasks, where each task requires a sequence of actions. The ultrasound system cannot perform conflicting actions at the same time. Accordingly, in some embodiments, actions conflict if they require the same resource, e.g., the same transmitter, the same receiver or the same area of memory. In other embodiments, actions conflict if the ultrasound beams from two different transmitters travel through the same area of the target and make it impossible for a receiver to identify the source.

Further, some actions depend on events that cannot be accurately predicted. For example, the system may need to wait for a mechanical arm to complete its movement before it fires the next beam. The system must wait for a laser to be charged before it can fire a laser beam. The time taken to charge a laser varies significantly and cannot be predicted to the required accuracy. The ultrasound system indicates the completion of mechanical movement or laser charging by signaling events. Thus, some actions may depend on asynchronous events.

Accordingly, in some embodiments, the ultrasound system supports changes to the list of parallel tasks. For instance, a human user may view an ultrasound image and request new functions to be performed. An automated system may change the list of tasks in response to analysis of the ultrasound results. In some embodiments, the automated system uses the adaptive scheduler to schedule actions from the updated task list. Scheduling the actions may include signaling to a processor to send commands to other units to perform the actions. The adaptive scheduler may be implemented in hardware, software, firmware or any combination thereof as discussed below. In prior ultrasound systems, a skilled human operator is required to analyze results and modify ultrasound parameters. For example, an ultrasound operator may wish to locate a human heart valve, monitor the heart rate and measure the shape of the heart valve movement. In one embodiment of the invention, the automated system employs analysis software to monitor the ultrasound results. The analysis software determines the required task-list changes and signals an appropriate event to the adaptive scheduler. The analysis software modifies the task-list while searching for the heart valve. The analysis software starts new tasks when the ultrasound system locates the heart valve. Thus, the ultrasound system needs to respond to events that change the task list (e.g., when it receives an event indicating that the heart valve is located from the analysis software or from the end user). In this example, the event may be a signal received by the adaptive scheduler that indicates that the heart valve is located. The signal may be a single bit digital signal wherein the high signal ('1') may indicate that the heart valve is located.

Accordingly, in one embodiment of the invention, the adaptive scheduler further described below handles the scheduling of task actions. Each task to be performed may include a plurality of task actions. For instance, a task to be performed by the ultrasound system may be measuring the blood flow. The task actions included in the task of measuring the blood flow may include: firing one of the beams, and collecting the data (e.g., ultrasound data) from the beam. The adaptive scheduler adapts the schedule of task actions to ensure that actions do not conflict. When adapting the schedule of task actions, if actions are found to conflict, in one embodiment, the adaptive scheduler ensures that high priority actions are handled prior to lower priority actions. The adaptive scheduler handles events. The events may be signals received by the adaptive scheduler that indicate the completion of certain tasks or task actions. For example, when an external unit (e.g., robot arm) has completed the movement required, the event received may be a signal that indicates that the external unit has completed the movement. The events may also be a signal received from an input device that indicates that a list of tasks has been inputted by the user. In some embodiments, events can cause the adaptive scheduler to pause task actions, modify task parameters, add or delete tasks and to invoke software procedures such as analysis software for locating a heart valve. In other embodiments, in response to events, the adaptive scheduler sends a signal to the processor to send commands to probe units or external units to start executing a task action. For instance, in response to receiving an event that indicates that data has been collected from a first beam associated with a higher priority, the adaptive scheduler may signal to the processor to send a start command to the second beam of a lower priority. In some embodiments, the adaptive scheduler sends the commands to the probe units or external units instead of the processor.

In one embodiment, an ultrasound apparatus provides an application programming interface that allows an application program to control multiple simultaneous functions and make dynamic (or adaptive) changes during ultrasound beam firings.

FIG. 1 shows an ultrasound system including an adaptive scheduler for executing ultrasound system actions in real time according to an embodiment of the invention. As shown in FIG. 1, the ultrasound system 100 may include an adaptive scheduler 105. In one embodiment, the adaptive scheduler 105 is coupled to one or more probe units 110. Each probe unit 110 typically controls one or more transducers embodied therein. The transducers typically contain multiple elements capable of transmitting and receiving ultrasound beams. In one embodiment, the adaptive scheduler 105 is part of a processing unit 120, that handles user interactions, image display and system control. In one embodiment, the adaptive scheduler 105 is implemented as a software procedure executing on a processor. In some embodiments, the adaptive scheduler 105 includes a dedicated processor that is only used for adaptive scheduling. In a second embodiment the adaptive scheduler 105 is implemented in hardware. For instance, the adaptive scheduler 105 may include application-specific integrated circuit (ASIC) and/or field-programmable gate array (FPGA). The processing unit 120 may include a microprocessor, a microcontroller, a digital signal processor, or a central processing unit, and other needed integrated circuits such as glue logic. The term "processor" may refer to a device having two or more processing units or elements, e.g. a CPU with multiple processing cores. The processing unit 120 may be used to control the operations of the adaptive scheduler 105. For example, the processing unit 120 may executes software to control the adaptive scheduler 105 (e.g. to transmit and receive data to other components of system 100 (e.g., external units 150, probe unit 110). In some cases, a particular function may be implemented as two or more pieces of software that are being executed by different hardware units of a processor.

In one embodiment, the processing unit 120 sends probe control commands, telling the probe units 110 when to fire specific beams and when to collect data. Such operation, as explained in further detail herein below, is performed, for example, from a memory 125 containing instructions that are executed by the processing unit 120. A memory 125 may also be included in the adaptive scheduler 105. The memory 125 that may include one or more different types of storage such as hard disk drive storage, nonvolatile memory, and volatile memory such as dynamic random access memory. The memory 125 may also include a database that stores data received from the probe units 110 and the external units 150. The memory 125 may also store instructions (e.g. software; firmware), which may be executed by the processing unit 120. As multiple operations of the ultrasound system may be needed (e.g., firing beams at various times), a task list is generated and altered by the adaptive scheduler 105 to address the combination of actions that are desired by the user of the system 100, further described herein. This embodiment of the invention provides for flexibility that is not achievable in prior art systems. The processing unit 120 is configured to further retrieve data collected by a probe unit 110 data. The processing unit 120 takes input commands from one or more input devices 130. The input devices 130 may be a keyboard, mouse, or touch screen that allows a user to input commands.

The input devices 130 typically provide high-level commands to the processing unit 120 which in turn, under control of the embedded instruction memory 125 performs at least the tasks described in greater detail herein below. The processing unit 120 may output at least a result respective of the data collected to, for example, a display unit 140 that is coupled to the processing unit 120. A display unit 140 may be replaced or augmented by a storage unit (not shown) to allow the storing of the collected data for future use. The display unit 140 may show an image, a video comprised of a series of image frames, text, as well as combinations thereof.

While a single adaptive scheduler is referenced herein the use of a plurality of adaptive schedulers is possible without departing from the scope of the invention. As discussed above, the adaptive scheduler may be implemented in hardware, for example through a configurable circuit, or in memory of the system 100, where the memory is loaded with instructions, which when executed by the processor, causes the processor to perform methods of adaptively scheduling the task actions or cause the processor to control the adaptive scheduler, or adaptive schedulers. In one embodiment, cycle accurate timing for the firing of the beams is provided by the system 100 based, at least in part on the directions or signals received from the adaptive scheduler. In some embodiments, the adaptive scheduler may be used to configure at least a probe unit.

In an embodiment, the ultrasound system 100 may control one or more external units 150, such as lasers, robot arms and motors. The external units 150 may also require time synchronization with probe units 110 operations. In one embodiment, the processing unit 120 sends external units 150 control commands based on the adaptive scheduler 105's selected task action as further explained below. For example, the processing unit 120 may send a control command telling a robot arm (e.g., external unit 150) to move a probe upon receipt of a signal from the adaptive scheduler 105 that received an event indicating that a unit of data has been collected.

The ultrasound system 100 may receive a specification of ultrasound system tasks and events through, for example, input devices 130. The ultrasound system 100 generates a task list identifying a sequence of task actions. Some of the task actions may have real-time constraints and some may depend on events. For instance, some task actions may not start until an event is received by the adaptive scheduler 105. For example, the task action may be to move a robot arm which cannot begin until an event is received that indicates that the data from a beam is finished being collected. In one embodiment, the ultrasound system 100 computes the time needed to complete each task action in the specification received. The ultrasound system 100 generates a list of the task actions using a linked list in memory 125. In some embodiments, the specification may include tasks and events that are associated with multiple beam firings of different types. A beam firing task action may require a setup time which is the amount of time needed to configure the transducer before firing a beam. The setup time may depend on the transducer. Different beam firing types are called modes. Switching modes (for example, switching from B-Mode mode to color-flow Doppler) typically requires a mode switching delay. The switching delay acts as an additional setup time. Each beam firing task action has a firing time, also known as pulse duration, which is the amount of time that the transducer outputs ultrasound waves. The firing time depends of the beam type and the purpose of the beam firing. For instance, a shorter firing time can give a better quality image. Doppler beams have a longer firing period than B-Mode beams. Each beam also has a collection time, which is the time needed to receive the reflected or pass-through ultrasound waves. The ultrasound propagation time depends on the medium through which the beam passes. The collection time depends on the depth of the scan. The ultrasound system 100 may need to distinguish the source of the collected data. Accordingly, the ultrasound system 100 may avoid two beams firing at the same time. A "dead-time" time interval between data collection and the next beam firing may also be introduced as needed.

Some beam types have a pulse repetition period which is the time between successive firings. Successive firings lead to the construction of a single image. Repeating this sequence of firings can generate multiple images. The ultrasound system 100 may, for instance, have a requirement to generate 60 images per second. Doppler beams have a pulse repetition period whereas B-mode scan beams do not.

Some beam firings need to be consecutive in time. Using multi-focal-zones allows the ultrasound system 100 to get significantly better image quality. The ultrasound system 100 scans with beams focused at different distances. The ultrasound system 100 may scan with the first beam focused at 0-5 centimeters (cm), a second beam focused at 5-10 cm and a third beam focused at 10-15 cm. The data collected from the three different levels may be combined to form one line of an image. This beam firing sequence can be repeated using different collectors to generate a complete image. The ultrasound system 100 may need to schedule the actions that generate a single line consecutively.

In one embodiment, the processing unit 120 receives an input specification including a list of tasks (or task list) to be performed that includes ultrasound tasks and external unit tasks. Each ultrasound task may include, for example: the beam type, the number of beam firings, the setup time, the firing time, the dead-time, the pulse repetition period, the desired images per second rate, the number of multi-focal zones, and other timing constraints. Each external unit function (e.g., an external unit task) may include, for example: desired external unit task actions and the desired external unit task actions' timing constraints. The desired external unit task action may be for example a movement of a robot arm. The processing unit 120 or the adaptive scheduler 105 processes each task description and produces a list of sequential task actions such as beam firing actions and data collection actions. The task list may also include a plurality of tasks that are associated with a plurality of beams of differing priority levels. In some embodiments, the plurality of tasks includes at least one of a photoacoustic laser firing task and an electrocardiogram (ECG) task.

In one embodiment, the processing unit 120 creates a schedule of timing actions ("task list") and selects a task action following the method described herein. It should be understood that the processing unit 120, in one embodiment, may schedule the dependent or independent operation of a plurality of probe units 110 coupled to the probe interface 230 such that their beam firing is either dependent or independent of each other. Each of the probe units 110 may have, for example, its own task list of ultrasound actions that may be adaptively modified by the adaptive scheduler 105. In another embodiment, a single task list that may be adaptively modified by the adaptive scheduler may be used to cause the firing of beams by at least one of the plurality of probe units 110. Similarly, a plurality of external units 150 may be coupled to the probe interface 230 illustrated in FIG. 2, or in one embodiment, a dedicated interface (not shown) used to couple a plurality of external devices 150 to the processing unit 120. In one embodiment, the adaptive scheduler 105 may use one or more task lists to cause the operation of the one or more probe units 110 and the one or more external units 150. These operations being performed independent or dependent of each other. As discussed above, the ultrasound system 100 may receive a specification of ultrasound system tasks and events through, for example, a feedback resulting from measurements made by the system 100 or from input devices 130 (e.g., a change requested by a user of the system 100 by entering an input). These changes may occur in real-time as the system 100 executes the task list including the tasks that may include tasks and task actions that were earlier entered to the system 100. It should be further understood that task actions included in the task lists may be added as well as removed in real-time by the adaptive scheduler 105 and the task actions included in the task lists may also be added and removed when the system 100 is off-line for reconfiguration.

Figure 2:
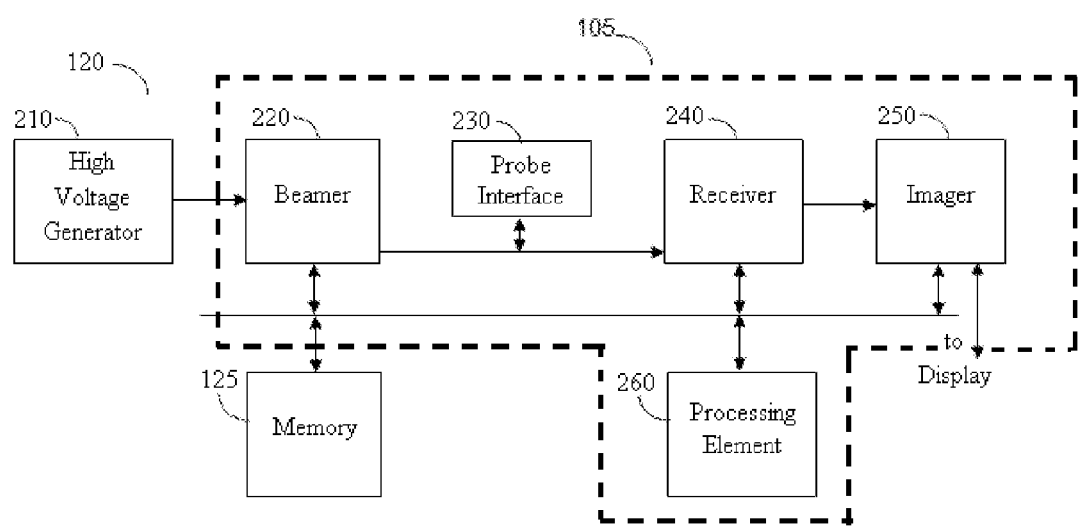
FIG. 2 shows a block diagram representation of the details of the processing unit of the ultrasound system according to an embodiment of the invention.

FIG. 2 shows a block diagram representation of the details of the processing unit of the ultrasound system according to an embodiment of the invention. In this embodiment, the processing unit 120 comprises a high voltage generator 210, the memory 125 and the adaptive scheduler 105. The adaptive scheduler 105 may comprise a beamer 220, a probe interface 230, a receiver 204, an imager 250 and a processing element 260. In some embodiments, the adaptive scheduler 105 also includes the high voltage generator 210 and the memory 125. In the embodiment in FIG. 2, the high voltage generator 210 is coupled to the beamer 220 and provides the high voltage necessary for the proper operations of at least the probes 110. In one embodiment, the probes 110 may be coupled to the processing unit 120 through probe interface 230 which is coupled to the beamer 220. In one embodiment, the beamer 220 generates control signals that control different functions of the probes 110 (e.g., controlling the firing of their beams). The beamer 220 may also generate the high voltage transmission signals that are converted by transducers included in the probe 110 into the ultrasound signals that are fired by the probes 110. The beamer 220 may provide the control signals and/or the high voltage transmission signals to the probes 110 via the probe interface 230. In one embodiment, the probe interface 230 is also used to interface to the external units 150. As shown in FIG. 2, the probe interface 230 may further coupled to a receiver 240. The receiver 240 may receive and shape or process data signals from at least one of the probe units 110 into a useable form. For instance, the probe unit 110 generates ultrasound signals that are fired onto an object (e.g., human body) and the "bounce back" signal from the object is received by the probe unit 110. The "bounce back" signal is transmitted from the probe unit 110 to the receiver 240 via the probe interface 230. The receiver 240 may then shape and process the data signal from the probe unit 110 (e.g., the "bounce back" signal) and may provide the shaped data signals to an imager 250. In some embodiments, the receiver 240 may shape or process the signals by analog-to-digital conversion or by performing noise reduction or noise filtering. The receiver 240 may also receive and shape or process data signals from at least one of the external units 120. Thus, the imager 250 may be coupled to the receiver 240 and to a display 140. The imager 250 may generate display signals based on the data signals received from the receiver 240. The display signals may then be transmitted from the imager 250 to the display 140 to be displayed as an image, text and/or video. In other embodiments, the receiver 240 may further provide the data signals from the probe unit 110 to the processing element 260 to analyze the data signals and assess whether the next task action in the task list can start. For example, the probe unit 120 may transmit a data signal to the adaptive scheduler 105 via the probe interface 230, the data signal may be processed by the receiver 240 and provided to the processing element 260 that analyzes the shaped data signal and determines that the shaped data signal provides the results of a B-Mode beam firing which indicates that the task action of beam firing from the B-Mode beam is completed. Accordingly, in this example, the processing element 260 of the adaptive scheduler 105 determines that beam having a lower priority than the B-Mode beam may start its task action without interfering with the B-Mode beam's task actions. As illustrated in FIG. 2, the beamer 220, the receiver 240 and the imager 250 are coupled to the processing element 260 (e.g., processor, a digital signal processor, microprocessor, application specific integrated circuit, a micro-controller, etc.) that may further be coupled to a memory 125. The memory 125 contains instructions that when executed by the processor element 260 cause the processing unit 120 (or the processor element 260) to control the adaptive scheduler 105 to adaptively schedule the tasks performed by the system 100 as described herein. For instance, the execution of the instructions stored in memory 125 may cause the processor element 260 to (i) signal to the beamer 220 to generate signals that cause the probes 110 to fire their beams and to provide the signals to the probes 110 via the probe interface 230, (ii) configure the receiver 240 to receive data signals from the probe 110 and/or the external units 120, and (iii) signal to the imager 250 to generate display signals based on the data signals received from the receiver 240. In another embodiment, as discussed above, the instructions stored in the memory 125 may be executed by a processor that is included in the processing unit 120 that is separate from the adaptive scheduler 105. The memory 125 may be further used to store data at least images generated by the imager 250. In one embodiment, the processing unit 120 may be implemented as a monolithic integrated circuit (IC) which may or may not include certain elements thereof. For example, high voltage generator 210 may be implemented off-chip. Furthermore, the system 120 may be implemented in whole or in part on a monolithic IC, including but not limited to a system-on-chip (SoC) implementation.

An application programmer develops an ultrasound application program by writing source code that references ultrasound library procedures defined by an application programming interface. The source code is written in a computer language such as C or C++. The application programmer uses programming development tools that include an editor, a compiler and a linker. The programming development tools run on a computer system. In one embodiment, the application programmer uses programming development tools that run on processing unit 120. In one embodiment, the generated application program is stored in the memory 125 and executed by processing unit 120 or processing element 260.

The processing unit 120 may include one or more ultrasound platforms. Each ultrasound platform may operate independently and may be controlled through the application programming interface (API) via API procedures specified and included in the API. In one embodiment, the processing unit 120 includes multiple hardware schedulers (e.g., adaptive scheduler 105). Each of the hardware schedulers may be a separate ultrasound platform controlling separates probes and external units.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a procedure, etc.

Figure 3:
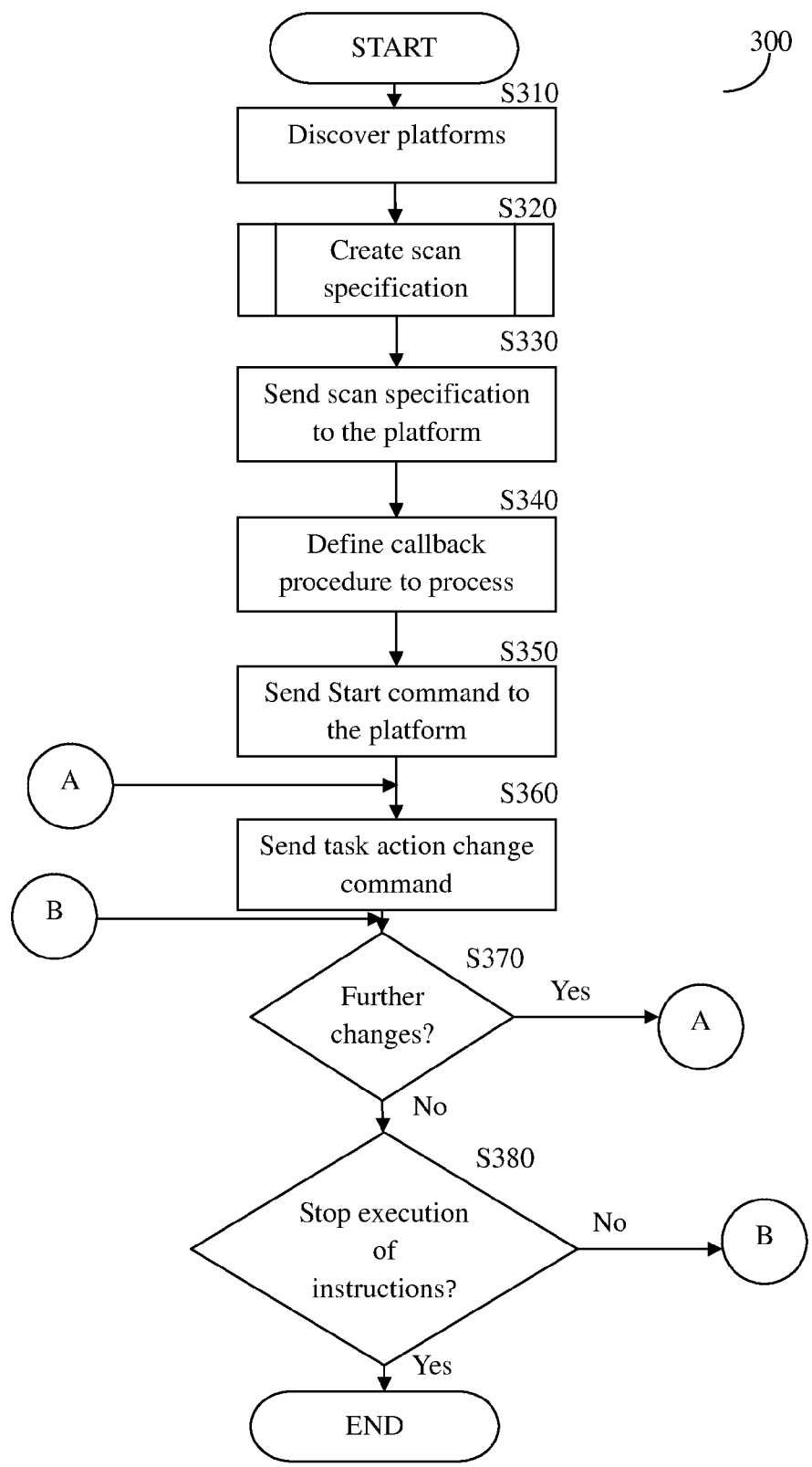
FIG. 3 shows a flowchart of an example method of controlling ultrasound actions using an API according to an embodiment of the invention.

FIG. 3 shows a flowchart of an example method 300 of controlling ultrasound actions using an API according to an embodiment of the invention. In one embodiment, an application program that is stored in the memory 125 includes instructions, which when executed by the processor 120, causes the processor to perform the example method 300. In one embodiment, the processor executes an ultrasound application program that includes API procedure calls. An API library may store instructions corresponding to the API procedures on a computer medium. The processor may execute the corresponding library instructions to implement application program calls to API procedures. Referring to FIG. 3, in S310, the processor 120 executes an API procedure to discover which of the ultrasound platforms (e.g., adaptive scheduler 105) may be used. The API procedure discovers the ultrasound platforms that may be used and may return the handles (or identifiers) of each of the ultrasound platforms that may be used. The handles may be used in subsequent API calls to identify the ultrasound platforms, respectively. In S320, the processor 120 creates a scan specification that includes a list of task actions to be performed by the ultrasound system. The scan specification is further detailed in FIG. 4 below. In S330, the processor 120 executes an API procedure to send the scan specification to each of the ultrasound platforms that may be used. The processor 120 may also execute the API procedure to check the scan specification and return an error code if the specification is determined to contain errors. For instance, the API procedure sends an error code if the scan specification is incomplete or if the API procedure cannot resolve a conflict between competing task actions of the scan specification. The application program normally checks the return error code, and may stop to allow the application programmer to make corrections or it may take corrective action programmatically.

In S340, processor 120 may execute an API procedure to define a callback procedure that will receive the beam firing results. The callback procedure may cause the processor 120 to receive imaging data that may then be transmitted to the display 140, and stored on a computer-readable medium or sent to a separate external device. In S350, the processor 120 may execute an API procedure to signal to the ultrasound platform (e.g., the adaptive scheduler 105) to start execution of the task actions included in the scan specification. In executing the task actions, the ultrasound platform may initialize the appropriate hardware, start beam firing, and start data collection. In S360, the processor 120 may execute API procedures to dynamically change the task actions included in the scan specification. The changes to the task actions may be based on end-user input, based on analysis of the beam firing data results by the processor 120, based on hardware status determined by the processor 120, or based on predefined program behavior (e.g, the application program stored in memory including instructions causing the processor 120 to change the task actions). In S370, the processor 120 may decide if more changes to the task actions are to be made. The process 300 continues to S360 if the processor 120 determines that more task action changes are required and the process 300 continues to S380 if the processor 120 determines that more parameter changes are not required. At S380, the processor 120 decides if execution of the task actions in the scan specification should be stopped. The processor 120 may stops execution of the task actions if a stop condition is detected. The process 300 continues to S370 if a stop condition is not detected by the processor 120. Detecting stop conditions include, for example, receiving an end-user input to stop, detecting a platform error, detecting that a predetermined amount of time has elapsed, etc. In one embodiment, the processor 120 may call an API procedure to stop the ultrasound platform in order to stop execution of the task actions. In some embodiments, the process 300 may proceed to S340 before S330.

Figure 4:
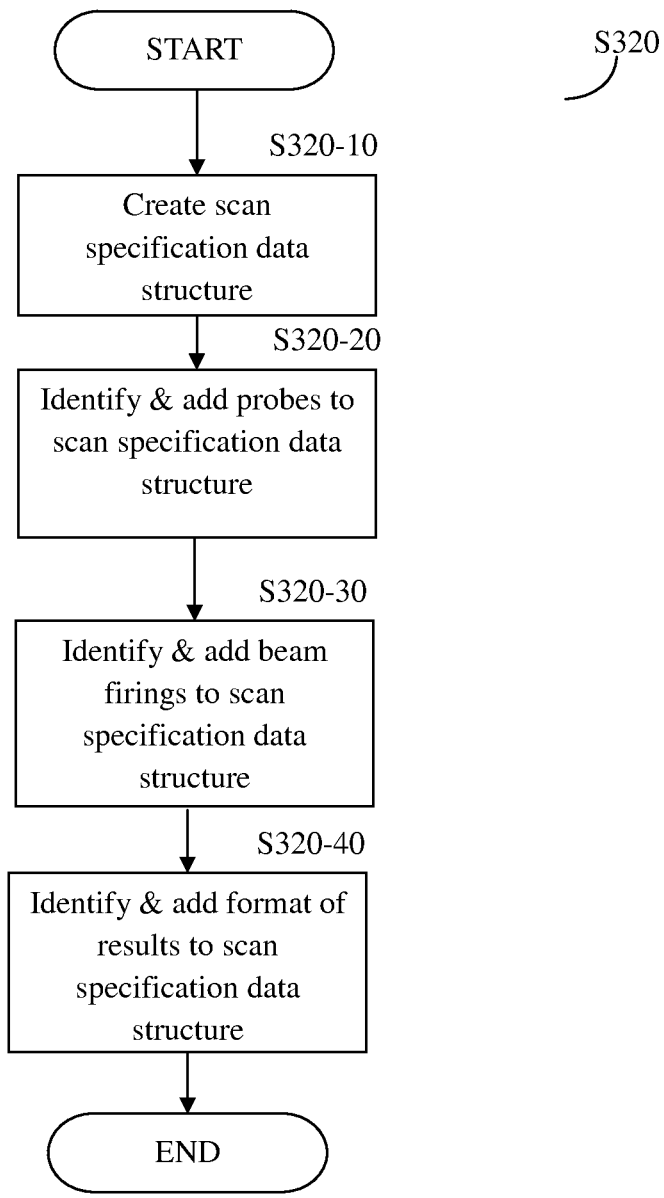
FIG. 4 shows a flowchart of an example method for creating a scan specification including a list of task actions.

FIG. 4 shows a flowchart of an example method for creating a scan specification including a list of task actions at S320 of FIG. 3. In S320-10, the processor 120 calls an API procedure to create a scan specification data structure. The scan specification data structure may be, for instance, a linked list, an array, etc. In S320-20, the processor 120 calls an API procedure to define one or more probes to be used. As discussed above, the processor 120 may receive a specification of ultrasound system tasks and events through, for example, input devices 130. The processor 120 generates a task list identifying a sequence of task actions to be performed by the ultrasound system 100. Accordingly, the one or more probes to be used may be defined by the API procedure in S320-20 as the probes that are to be used to perform the task actions. The processor 120 calls API procedures to associate probes defined in S320-20 with task actions that require a probe included in the scan specification. In one embodiment, the probes are associated with the task actions in the scan specification by being stored in the data structure. Each entry in the data structure regarding a probe may include parameters defining the probe radius, angle, and number of transducer elements. In S320-30, the processor 120 calls API procedures to identify beam firings. For instance, the API procedures may identify the beams that are to be fired in order to perform the task actions. The processor 120 calls API procedures to associate the beam firings that are identified with the task actions that require a beam firing in with the scan specification. In one embodiment, the beam firings are associated with the task actions in the scan specification by being stored in the data structure. Each entry in the data structure regarding a beam firing may include parameters including the type (e.g., B-Mode), number of beams, number of parallel beams, transmit frequency, number of cycles, starting depth, ending depth, focal depth, transmit frequency stop, receive frequency stop, receive window, beam angle and center angle. The processor 120 calls additional API procedures to control other parameters including: brightness, decimation factor, dynamic range, transmit voltage and logarithmic scale. In S320-40, the processor 120 calls API procedures to define the format of beam firing results. The processor 120 calls API procedures to associate this format with each of the task actions that requires a beam firing result the scan specification. In one embodiment, the format is associated with the task actions in the scan specification by being stored in the data structure. Each entry in the data structure regarding the format of the beam firing result may include image layout parameters including image width, image height, upper left point position and upper right point position.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Digital Versatile Disc (DVD), Flash Memory, Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention claimed is:

1. An apparatus to control and execute ultrasound system actions comprising:
an application programming interface (API) that includes an API procedure;
a processor;
an adaptive scheduler coupled to the processor that includes:
a beamer to generate signals,
a probe interface coupled to the beamer, the probe interface to transmit the signals to at least one probe unit and to receive signals from the at least one probe unit, and
a receiver coupled to the processor and the probe interface, the receiver to receive and process the signals received from the probe interface; and a memory to store instructions, which when executed by the processor, causes the processor:
to generate a task list including a plurality of task actions that is used by the adaptive scheduler for adaptive scheduling, wherein the plurality of task actions include parallel ultrasound tasks and each ultrasound task includes a sequence of actions, wherein at least one of the ultrasound tasks includes a timed beam firing sequence, wherein at least one of a probe or a beam is required to perform the task actions,
to adaptively modify the task list based on signals received from an input device or from a receiver,
to execute the API procedure to generate a scan specification including the task list, the scan specification being a data structure including the task actions, and
to execute the API procedure to identify at least one of:
the probe required to perform the task actions,
the beam required to perform the task actions and requirements and parameters associated with the beam, or
a format of a beam firing result.

2. The apparatus of claim 1, wherein the memory to store instructions, which when executed by the processor, further causes the processor:
to execute the API procedure to associate with the task actions, respectively, at least one of:
the probe required to perform the task actions,
the beam required to perform the task actions and requirements and parameters associated with the beam, or
the format of a beam firing result.

3. The apparatus of claim 2, wherein the memory to store instructions, which when executed by the processor, further causes the processor:
to execute the API procedure to send the scan specification to the adaptive scheduler to start execution of the task actions included the scan specification.

4. The apparatus of claim 3, wherein the memory to store instructions, which when executed by the processor, further causes the processor:
to execute the API procedure to dynamically change the task actions included in the scan specification.

5. The apparatus of claim 4, wherein the change to the task actions is performed without stopping current beams firings.

6. The apparatus of claim 4, wherein the memory to store instructions, which when executed by the processor, further causes the processor:
to execute the API procedure to check the scan specification and return an error code upon determination that the scan specification contains errors.

7. The apparatus of claim 4, wherein the memory to store instructions, which when executed by the processor, further causes the processor:
to execute the API procedure to stop execution of the task actions in the scan specification upon detection of a stop condition.

8. The apparatus of claim 1, wherein the beams are ultrasound beams that include at least one of Doppler beams or B-Mode beams.

9. An ultrasound system to control and execute ultrasound system actions comprising:
at least one probe unit,
an input device to receive a task list inputted by a user;
an application programming interface (API) that includes an API procedure;
a processor;
an adaptive scheduler coupled to the processor; and
a memory to store instructions, which when executed by the processor, causes the processor:
to generate a task list including a plurality of task actions that is used by the adaptive scheduler for adaptive scheduling, wherein the plurality of task actions include parallel ultrasound tasks and each ultrasound task includes a sequence of actions, wherein at least one of the ultrasound tasks includes a timed beam firing sequence, wherein at least one of a probe or a beam is required to perform the task actions on the patient,
to adaptively modify the task list based on signals received from the input device or from a receiver,
to execute the API procedure to generate a scan specification including the task list, the scan specification being a data structure including the task actions,
to execute the API procedure to identify at least one of:
the probe required to perform the task actions,
the beam required to perform the task actions and requirements and parameters associated with the beam, or
a format of a beam firing result, and
to execute the API procedure to send the scan specification to the adaptive scheduler to start execution of the task actions included the scan specification.

10. The system of claim 9, wherein the memory to store instructions, which when executed by the processor, further causes the processor:
to execute the API procedure to associate with the task actions, respectively, at least one of:
the probe required to perform the task actions,
the beam required to perform the task actions and requirements and parameters associated with the beam, or
the format of a beam firing result.

11. The system of claim 10, wherein the adaptive scheduler comprises:
a beamer to generate signals,
a probe interface coupled to the beamer, the probe interface to transmit the signals to at least one probe unit and to receive signals from the at least one probe unit, wherein the signals cause the at least one probe unit to fire their beams, respectively, and a receiver coupled to the processor and the probe interface, the receiver to receive and process the signals received from the probe interface.

12. The system of claim 11, wherein the memory to store instructions, which when executed by the processor, further causes the processor:
to execute the API procedure to dynamically change the task actions included in the scan specification.

13. The system of claim 12, wherein the change to the task actions is performed without stopping current beams firings.

14. The system of claim 12, wherein the memory to store instructions, which when executed by the processor, further causes the processor:
to execute the API procedure to check the scan specification and return an error code upon determination that the scan specification contains errors.

15. The system of claim 12, wherein the memory to store instructions, which when executed by the processor, further causes the processor:
to execute the API procedure to stop execution of the task actions in the scan specification upon detection of a stop condition.

16. The system of claim 11, the adaptive scheduler further comprising:
an imager to generate display signals based on the signals received from the receiver and to transmit the display signals to a display.

17. The system of claim 9, wherein the beams are ultrasound beams that include at least one of Doppler beams or B-Mode beams.

18. A method to control and execute ultrasound actions comprising:
receiving by a processor a task list including a plurality of task actions on a patient,
wherein the plurality of task actions include parallel ultrasound tasks and each ultrasound task includes a sequence of actions, wherein at least one of a probe or a beam is required to perform the task actions for adaptive scheduling, wherein at least one of the ultrasound tasks includes a timed beam firing sequence,
adaptively modifying by the processor the task list based on signals received from an input device or from a receiver,
executing by the processor an API procedure to generate a scan specification including the task list, the scan specification being a data structure including the task actions, and
executing by the processor the API procedure to identify at least one of:
the probe required to perform the task actions,
the beam required to perform the task actions and requirements and parameters associated with the beam, or
a format of a beam firing result.

19. The method in claim 18 further comprising:
executing by the processor the API procedure to associate with the task actions, respectively, at least one of:
the probe required to perform the task actions,
the beam required to perform the task actions and requirements and parameters associated with the beam, or
the format of a beam firing result.

20. The method of claim 19, further comprising:
executing by the processor the API procedure to send the scan specification to an adaptive scheduler coupled to the processor to start execution of the task actions included the scan specification.

21. The method of claim 20, further comprising:
executing by the processor the API procedure to dynamically change the task actions included in the scan specification.

22. The method of claim 21, wherein the change to the task actions is performed without stopping current beams firings.

23. The method of claim 21, further comprising:
executing by the processor the API procedure to check the scan specification and return an error code upon determination that the scan specification contains errors.

24. The method of claim 21, wherein the memory to store instructions, which when executed by the processor, further causes the processor:
executing by the processor the API procedure to stop execution of the task actions in the scan specification upon detection of a stop condition.

* * * * *